United States Patent [19]

Okada et al.

[11] Patent Number: 5,449,529
[45] Date of Patent: Sep. 12, 1995

[54] METHOD FOR PRODUCING COMPOSITE MATERIAL MAINLY COMPOSED OF CARBON AND BORON

[75] Inventors: Osamu Okada; Hiroaki Ogura; Toshiaki Sogabe, all of Kagawa, Japan

[73] Assignee: Toyo Tanso Co., Ltd., Osaka, Japan

[21] Appl. No.: 104,410

[22] Filed: Aug. 10, 1993

Related U.S. Application Data

[63] Continuation of Ser. No. 729,723, Jul. 15, 1991, abandoned.

[30] Foreign Application Priority Data

Jul. 30, 1990 [JP] Japan .................. 2-203620
Aug. 9, 1990 [JP] Japan .................. 2-212074
Dec. 5, 1990 [JP] Japan .................. 2-413604

[51] Int. Cl.⁶ .......................................... B05D 3/02
[52] U.S. Cl. ...................... 427/228; 427/399; 427/376.1; 427/443.2; 428/240; 428/245; 428/408

[58] Field of Search ............ 427/228, 399, 376.1, 427/443.2; 428/408, 240, 245; 264/29.6, 60

[56] References Cited

U.S. PATENT DOCUMENTS 3,914,508 10/1975 Hooton et al. .................. 428/408
4,439,382 3/1984 Joó et al. ........................ 427/113
4,476,164 10/1984 Veltri et al. ..................... 428/408

Primary Examiner—Shrive Beck
Assistant Examiner—David M. Maiorana
Attorney, Agent, or Firm—Armstrong, Westerman Hattori, McLeland & Naughton

[57] ABSTRACT

There is provided according to the invention a method for producing a composite material mainly composed of a carbon and boron comprising the steps of impregnating a carbon material with a boron oxide and/or a hydrate compound thereof, and baking such carbon material under pressure by inert gas at a temperature of not lower than 1500° C. A neutron absorbent and an oxidation resistant carbon material both including the composite material are also provided.

10 Claims, 4 Drawing Sheets

METHOD FOR PRODUCING COMPOSITE MATERIAL MAINLY COMPOSED OF CARBON AND BORON

This application is a continuation of application Ser. No. 07/729,723 filed Jul. 15, 1991, now abandoned.

BACKGROUND OF THE INVENTION

1. Field of the Invention

The present invention relates to a composite material of carbon-boron (hereinafter referred to as C-B) and, more particularly, to a method for producing a composite material in which a boron component (hereinafter referred to as B) is evenly dispersed or distributed in the form of ultrafine particles in a carbon component (hereinafter referred to as C) and to various uses of the composite material obtained by the method, in particular, uses as a neutron absorbent and as an oxidation resistant carbon material.

2. Description of Prior Art

C-B composite material has been heretofore popularly researched, developed and used as a neutron absorbent in atomic industry, as a carbon material having oxidation resistance and as a structural material for machines.

A conventionally employed method for producing the C-B composite material comprises the steps of mixing a $B_4C$ (boron carbide) produced separately with either a carbon material or a material which can be carbonized, baking them at high temperature, and treating them to be transformed into a solid solution, as is disclosed in Japanese Laid-Open Patent Publication (unexamined) No. 1987-108767, Japanese Patent Application No. 1987-297207, etc.

In the C-B composite material obtained according to the mentioned conventional process, $B_4C$ is mixed with carbon after crushing and grinding a large and rough solid of $B_4C$. In this respect, because such grinding is mechanically performed, there is a limit in the pulverizing of $B_4C$. Accordingly, in a C-B composite material thus obtained, there are a $B_4C$ portion, a solid solution portion of $B_4C$ and carbon, and a portion of carbon alone. In effect, when observed microscopically, the obtained C-B composite material is not always completely uniform as a whole.

In the mentioned conventional method, because the two kinds of powder are mixed together, molded and baked, there arises a difficulty in the steps of cutting and machining the baked material, hence a problem exists from the economical point of view in that material productivity of expensive $B_4C$ is considerably reduced by removal and waste of cut powder.

Moreover, a most serious problem in the conventional method exists in that a large amount of mineral impurities other than boron are included (usually 5000 ppm). Those impurities come mixed into the composite material due to contact with machines and equipment made of steel continuously during each step of grinding, mixing, molding and baking of compound material. This disadvantage is very difficult to overcome in the conventional methods. Coexistence of a small amount of mineral impurities may not be a serious problem depending upon the use of B-C composite material. However, when employing such a B-C composite material mixed with mineral impurities as a material for atomic industry, the mixed mineral impurities generate simultaneously reactions such as isotope transformation, splitting, etc. by radiation exposure or the like. Accordingly, when using it as a nuclear fusion material, a fatal disadvantage of decreasing plasma temperature due to high temperature elements emitted from the impurities will come out. Therefore, as a carbon material for use in atomic industry, a highly purified specific material, i.e. an ultrahighly pure material of which mineral impurity is not more than 5 ppm, more preferably not more than 2 ppm, substantially 0 ppm (measured by atomic absorption photometer) is usually employed. In a method for processing such an ultrahigh pure material, the mineral impurities are eliminated by halogenation treatment of high volatility, as is disclosed in the Japanese Patent Application No. 61-224131 for example. In the composite material of $B_4C$-C, however, because of the existence of boron in carbon material, impurities cannot be eliminated by using the mentioned treatment.

The mentioned disadvantage of the conventional method may result in a still further problem in that when using a crucible for melting alloy, stirring bars etc. necessary to obtain a specifically precious composition in metallurgical industry and the mentioned instruments are oxidated and worn out, then impurities may be mixed into the alloy eventually resulting in pollution.

Also when using the mentioned composite material as a member to perform hot press for baking ceramics, the same problem of pollution as mentioned above may result.

SUMMARY OF THE INVENTION

Accordingly, an object of the present invention is to solve the above-discussed problems of the conventional method when using $B_4C$-C powder as a material and provide a superior B-C composite material.

Another object of the invention is to provide a novel use of the B-C composite material.

To accomplish the foregoing objects, the inventors have been engaged in research and development of superior composite material and, in the first place, adopted a method for impregnating boron oxide or hydrated compound into carbon material in the form of a melt or solution. By this method, it is now possible for a boron component to permeate into fine carbon particles surface or fine pores in carbon material at molecular level so as to be dispersed very finely throughout the entire carbon material as compared with the use of $B_4C$ fine particles.

Further, to use boron in the form of an oxide, a reaction method suitable for fixing boron into carbon by reaction between the oxide and carbon and suitable for solid solution treatment is also provided by the invention. In other words, the inventors have succeeded in developing a method comprising the steps of impregnating a liquid boron compound into a carbon material, and baking the mixture thus obtained at a high temperature under high pressure so that the impregnated boron compound is not volatilized from the carbon material and the boron reacts sufficiently on carbon.

It has been recognized by the inventors that the novel C-B composite material obtained by the mentioned method performs an excellent function as a neutron absorbent and that this composite material exhibits a function of remarkably high oxidation resistance as compared with the conventional $B_4C$ powder mixing method. The composite material according to the invention not only overcomes such disadvantages of the prior art that, because of the use at high temperature under oxidation atmosphere resulting in oxidation wear, relative members or parts must have been frequently replaced, but also exhibits that the composite material is superior in oxidation resistance and satisfactory in machinability.

Described hereinafter is an illustrative reaction between boron oxide ($B_2O_3$) and carbon.

First Process

A molten boron oxide is impregnated into a cut compact of isotropic high concentration carbon material ("IG-11" produced by Toyo Tanso), for example, at 600° to 1400° C., more preferably at 800° to 1200° C. under pressure in a pressure container. In this case, it is preferable that the impregnation is carried out after once reducing pressure in the container so as to eliminate air out of fine pores of the carbon material, but such preliminarily degassing is not always necessary.

For impregnating $B_2O_3$ into the carbon material, several $kg/cm^2$ of pressure is needed, but 50 to 100 $kg/cm^2$ is preferable in order to impregnate $B_2O_3$ under pressure completely into the deep portion of carbon material. Required pressure value should be appropriately decided depending upon percentage of voids, particle size, distribution of pores, temperature, etc.

Second Process

The carbon material impregnated with $B_2O_3$ is then subject to heat treatment (hereinafter referred to as HIP) at high temperature under high pressure using inert gas as a pressure medium. As a result of this heat treatment using an inert gas such as Ar as a medium, a pressure is applied to the carbon material and $B_2O_3$ solution evenly from every direction as if pressure was hydraulically applied to them, thereby confining $B_2O_3$ into the carbon material while preventing evaporation thereof, thus chemical reaction between carbon and boron proceeds.

The pressure and temperature in the heat-treating apparatus is not respectively lower than 100 $kg/cm^2$ and 1500° C., preferably not lower than 2000° C. and 1500 to 2000 $kg/cm^2$. If the temperature is over 2300° C., undesirable reaction of decomposing the solid solution of carbon and boron may take place simultaneously.

The foregoing first and second processes are essential, and a following third process may be added to eliminate a small amount of $B_2O_3$ still remaining in the carbon material.

Third Process

The composite material after completing the HIP treatment in the foregoing second process is further treated under the pressure not higher than 10 Torr, preferably not higher than 5 Torr, and at the temperature not lower than 1000° C., preferably not lower than 1500° C., whereby quantity of $B_2O_3$ in the composite material is decreased to not more than 0.1%. In the B-C composite material thus obtained, boron is very finely and evenly dispersed and distributed throughout the composite material as compared with the conventional material employing $B_4C$ powder.

In the invention, any carbon material, including common carbon material, aerotropic carbon material, carbon-carbon composite material (hereinafter referred to as C/C material) in addition to the mentioned isotropic carbon material can be employed irrespective of kind thereof. Since carbon powder is not used in the invention, carbon can be boronized without changing the given shape, organization and structure of the carbon composite, i.e., as they are which is one of the most important advantages of the present invention.

When the mentioned boronization is carried out using an ultrahigh pure isotropic high density graphite as a matrix, for example, the quantity of impurities other than carbon and boron elements of the obtained composite material is very small, to the extent of less than 5 ppm which is substantially the same as purity value of the matrix on condition that a high pure boron compound is employed. This is because pollution possible to occur in the prior art during the mechanical steps of grinding, mixing compressive moldings does not take place at all.

The advantage of the method according to the invention is typically exhibited when boroninzing a carbon/carbon composite material. In the conventional method employing $B_4C$ powder, several specified equipments and techniques are needed for grinding to the particle size of less than 1 $\mu m$, and in which obtained fine particles are admixed with resin component, applied to carbon fibers, thus making a prepreg, which is then molded, hardened by heating and carbonized, finally obtaining a boronized C/C material. A serious problem, however, exists in that the carbon material cannot be completely graphitized. Because, despite that a high temperature of 2500° to 3000° C. is required for graphitization of carbon, $B_4C$ component begins decomposition at about 2300° C. Accordingly, it is almost impossible to insert fine $B_4C$ particles into the fine pores of the C/C material preliminarily graphitized by baking at a high temperature of 3000° C. Even distribution of boron the component into the deep portion of the C/C material is all the more difficult. The situation is same in the case of ordinary carbon block. As for the C/C material, however, there is a peculiar difficulty in achieving required boronization while keeping strength of carbon fibers.

On the contrary, boronization of C/C material can be performed very easily. As mentioned above, boron component can be forcibly press-fitted (compressively inserted) into fine pores of the carbon materials in the form of melt or solution in molecule size, and dispersed evenly into the deep portion. Furthermore, there is no change in organization of the C/C material as a result of forced press-fit (compressive insert) of the boron component and subsequent baking thereof, and carbon material is preliminarily graphitized at 3000° C. As a result, even when baking at 2000° C. to accelerate reaction of boronization, a compact including boron thus obtained has satisfiable physical property to be qualified as a C/C material.

In the meantime, any boron compound can be employed as a boron component to be impregnated into carbon material for achieving the object of the invention as long as the boron compound can be transformed into a solution by thermal melting or by solvent. However, any boron compound which leaves mineral impurities after being baked together with carbon material is not desirable because of inviting contamination of carbon material eventually resulting in restriction on the use. In other words, compound is desirable which either is thermally decomposed by baking or a decomposedly volatized by reaction with carbon leaving boron alone. From this viewpoint, it may be said that organic compound containing boron, boron halide, etc. are desirable. But from the viewpoints of economy and easy handling, boron oxide ($B_2O_3$) and hydrate compound such as boric acid $H_3BO_3$ can be said most suitable. For example, with regard to chemical reaction between $B_2O_3$ and carbon, a following baking reaction of $B_4C$ is well known:

$$2B_2O_3 + 7C \rightarrow B_4C + 6CO$$

It is, however, not always clear whether or not reaction of composite material (carbon-boron), which has been produced in such a manner that $B_2O_3$ of molecule size in a large amount of carbon as is done in the invention, follows exactly and smoothly the above mentioned reaction mechanism. In this respect, as a result of various analyses on the composite material obtained by the method shown in the later-described Example 1, 4% by weight of boron component (free $B_2O_3$ 0.02%) was measured depending upon chemical analysis. Further, as a result of observation by X-ray analysis, a peak value showing the existence of $B_4C$ was not found despite the fact of neutron absorption by the boron component was clearly recognized as a result of neutron irradiation. There was no other peak showing any other crystal system, though large broad parts were shown, hence it seems that the composite material is in an indefinite form or in a form of solid solution. Accordingly, it is supposed that final product obtained is not in a definite form showing a specific compound of $B_4C$, but is in a form of solid solution of $(B_xC_y+C)$, though the present invention is not restricted to the form of such solid solution.

Boron oxide ($B_2O_3$) as well as hydrate thereof can be used as the boron component in the invention. Boric acid ($H_3BO_3$, $B(OH)_3$) is one of such desirable hydrates, for example.

The mentioned boric acid has a relatively low melting point (185° C.) as compared with boron oxide ($B_2O_3$). Under the temperature higher than the mentioned, boric acid is decomposed while emitting $H_2O$, and transformed into a solid solution ($B_2O_3 \cdot nH_3BO_3$) to be kept in a state like a liquid. In this manner, when employing a boric acid as a starting material, the boric acid is kept to a temperature having a moderate viscosity in the container, i.e., at 300° to 500° C. while melting boric acid, then a carbon material is dipped therein and forcedly press fitted (compressively inserted) into fine pores of the carbon material. The second process (HIP treatment) following the mentioned first process (impregnation) can be performed in the same manner as the foregoing $B_2O_3$.

Described hereinafter is an embodiment of the method according to the invention in which the mentioned boron compound and carbon material are employed as starting materials.

The boron compound melts by heating and impregnated under pressure in a state of liquid or solution dissolved into an adequate solvent. For example, melting point of $B_2O_3$ is 450° C. under normal pressure, boiling point is 1500° C. and liquefied in this temperature range of 450° to 1500° C. Temperature range for the impregnation is 600° to 1400° C., preferably 800° to 1200° C.

In the first process step, $B_2O_3$ and carbon material are placed in a pressure container, then the $B_2O_3$ is press-fitted (compressively injected) in fine pores of the carbon compact by heating (vacuum) method under pressure. In this step, press-fit (compressive injection) of $B_2O_3$ is completely and easily performed by eliminating, before the press-fitting (compressive injection of) $B_2O_3$, air existing in the fine pores of the carbon material by temporarily reducing pressure in the container. However, this temporary pressure reduction is not always essential since press-fit pressure is high. The press-fit pressure may be several $kg/cm^2$, preferably 50 to 100 $kg/cm^2$.

In the second step, HIP treatment is performed. Even if the carbon material impregnated with boron compound in the first process is heated at 2000° C. under normal pressure, the carbon material is hardly boronized. This is because boron compound is evaporated by heating at high temperature, there is no room for solid solution by reaction with the carbon material. The heating in this second process is therefore required to be performed under pressure. For example, employing an inert gas such as Ar to be a medium, the heating should be performed under the pressure of not lower than 100 $kg/cm^2$ and at a temperature not lower than 1500° C., preferably 100 to 2000 $kg/cm^2$ and not lower than 2000° C. Boron compound is dissolved, dispersed and fixed to the carbon material by this HIP treatment.

The mentioned second process is as essential as the preceding first process. To get ordinary solid solution of carbon-boron, necessary cutting is performed at this stage to be put on sale in the market.

However, with respect to a material possible to be used in a specific use such as neutron absorbent for reactor, it is preferable that residual amount of $B_2O_3$ is as small as possible. When placing such $B_2O_3$ in a reactor and used at high temperature, $B_2O_3$ evaporated is precipitated and solidified at relatively low temperature portions, which may result in a problem, i.e., an obstacle of required reaction otherwise bring about corrosion of metal parts.

To meet the situation, following third process may be added to eliminate a small amount of $B_2O_3$ still remaining in the carbon material.

That is, the solid solution obtained through the second process is further treated under the pressure of not higher than 10 Torr, preferably not higher than 5 Torr, and at the temperature of not lower than 1500° C., thereby $B_2O_3$ being evaporatively eliminated.

As a result of carrying out the mentioned treatment, residual amount of $B_2O_3$ can be decreased to not more than 0.1%.

The material obtained by the method according to the present invention having multi-purpose property and versatility is satisfiably applicable to almost all use as superior reactor materials including oxidation resistant consumables, neutron aborbent, or as wall material facing a plasma in reactor, materials for aerospace industry, parts for metallurgy and machinery.

Furthermore, the composite material obtained according to the invention performing very excellent neutron absorption, oxidation resistance as compared with the conventional composite materials can be employed not only as neutron absorbent, crucible for molten metal, stirring bar, liquid level detection probe, nozzle for continuous casting, die for hot press, etc. but also in following uses;

(1) die for continuous casting;
(2) heating element;
(3) jigs such as stirring bar for molten metal, sensor probe:
(4) graphite for reactor (composite material containing B is not applicable as reactor core material for use in high temperature gas furnace);
(5) bearings used at high temperature;
(6) crucibles;
(7) casting molds for hot press;

(8) high jigs including post chips; and (9) carbon material for hermetic seal

In the composite material thus obtained according to the invention, boron is evenly diffused or distributed in carbon. Further, carbon compact thereof can be selective among any kind including C/C material, high density graphite, etc. and any shape. In effect, it may be said that a carbon boron composite material having never been obtained according to the prior art can be now obtained according to the invention.

DESCRIPTION OF PREFERRED EMBODIMENT

Example 1

First Process

Figure 1:
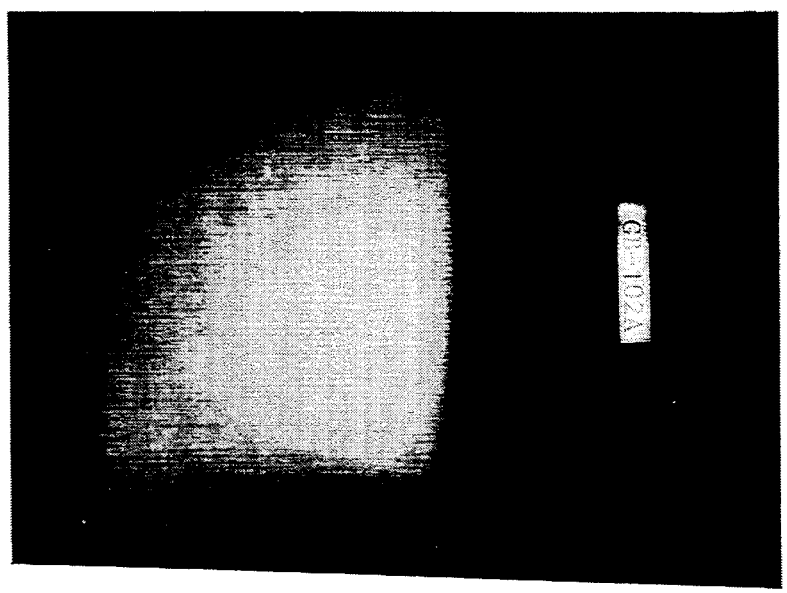
FIGS. 1 and 2 are schematic explanatory views prepared both based on photographs taken by exposure to neutron irradiation.

An isotropic graphite ("IG-11" produced by Toyo Tanso) was dipped in $B_2O_3$ (extra fine grade reagent) dissolved at 1200° C. using autoclave, then a pressure of 150 kg/cm$^2$ was applied to the dipped graphite using $N_2$ gas, thereby $B_2O_3$ being impregnated into pores of the graphite.

Second Process

After completing the impregnation process, boron was diffused in the graphite by means of a HIP treatment device at a temperature of 2000° C. and under a pressure of 2000 kg/cm$^2$ for 1 hour (employing Ar as pressure medium), thus a solid solution of graphite being obtained. In this respect, for carrying out the HIP treatment, the product to be treated was put in a cylindrical sheath of graphite on which a cap was applied.

Third Process

Thereafter, using a vacuum container, a vacuum treatment was performed at 2000° C. under 1 Torr for 1 hour. Boron concentration of the obtained composite material was measured by mannitol method by which it was recognized that the boron concentration was 4.0% by weight (with respect to boron element), among which $B_2O_3$ was 0.02% by weight. This means that almost all of $B_2O_3$ not reacted was evaporated and eliminated.

Example 2

The carbon-boron composite material obtained through Example 1 was further treated by repeating the same manner as Example 1. Boron concentration of the boron composite material thus obtained was 7% by weight, among which $B_2O_3$ was 0.03% by weight.

As apparent from the above description, it was acknowledged that content of boron in the composite material was increased.

Example 3

A plain weave cloth of PAN high strength carbon material (3000 filaments, 7 μm in fiber diameter, 300 kg/mm$^2$ in tensile strength) was impregnated with a phenolic resin solution (prepared by diluting a resol type phenolic resin with methanol to ½ to ⅓), and after drying it for 24 hours, a prepreg sheet was obtained.

This prepreg sheet was laminated in a dryer, heat-treated (at 100° C. for 0.5 hour), then placed on a die and treated by holding it in a hydraulic press at 140° C. under 50 kg/cm$^2$ for 1 hour. Thus, a 2 D compact comprising two sheets of laminate were obtained.

The compact thus obtained was inserted into coke powder and heat-treated up to 1000° C. under non-oxidation atmosphere at a temperature increasing speed of 10° C./hour, then further treated using a vacuum furnace up to a high temperature of 2000° C. under a reduced pressure of 5 Torr at a temperature increasing speed of 100° C./hour. As a result, a 2 D C/C composite material free from crack was obtained.

A solution prepared by adding 1 part by weight of $H_2O$ to 1 part by weight of boric acid ($H_3BO_3$) was added to the mentioned 2 D C/C composite material to be dipped and impregnated thereinto. $H_2O$ of the composite material was then evaporated in a dryer kept at 120° C. Thereafter, another impregnation treatment with an aqueous solution was further carried out. It was recognized that the aqueous solution obtained was relatively low in viscosity and impregnated easily into deep portion through the gap and fine pores.

After completing the mentioned first process (impregnation treatment), the second process was carried out on the same conditions as the foregoing Example 1, and a carbon-boron composite material mainly comprising of a matrix of C/C composite material was obtained. Boron concentration of the product thus obtained was 3.7% by weight (value converted to boron element).

Example 4

A mesophase spherical carbon ("KMFC" produced by Kawasaki Steel Corp.) was ground to fine particles of not larger than 5 m in average grain size. After thermo-compressive molding, the fine particles were baked at 2500° to 3000° C., and using the obtained highly pure ultrafine isotropic graphite material (hereinafter referred to as ISO-880), a reaction of boronization was performed in the same manner as that of Example 1.

This carbon matrix was a carbon material of high strength and of which fine particle's capacity is small. This as a result of performing a boronization in the same manner as the foregoing Example 1, it was recognized that concentration of boron in the obtained C-B composite material was 2.6% (by weight) and residual amount of $B_2O_3$ after the third treatment was not more than 0.01%.

In addition, Table 1 shows values obtained by analyzing the ISO-880 material and the elements other than boron after the reaction of boronization.

TABLE 1

| | (1) | | | | | | |
|---|---|---|---|---|---|---|---|
| Element | Al | As | B | Be | Bi | Ca | Cd | Ce |
| Purity level | | | | | | | | |
| ISO-880 | <0.3 | — | — | — | — | — | — | — |
| ISO-880 + B | <0.3 | — | (*) | — | — | — | — | — |

| | (2) | | | | | | |
|---|---|---|---|---|---|---|---|
| Element | Cr | Cu | Fe | Ga | Ge | Hg | In | K |
| Purity level | | | | | | | | |
| ISO-880 | — | — | <1.0 | — | — | — | — | — |
| ISO-880 + B | — | — | <1.0 | — | — | — | — | — |

| | (3) | | | | | | |
|---|---|---|---|---|---|---|---|
| Element | Li | Mg | Mn | Ni | P | Pb | Si | Sn | Ti |

TABLE 1-continued

| Purity level | | | | | | | | | |
|---|---|---|---|---|---|---|---|---|---|
| ISO-880 | — | <0.1 | — | — | — | — | <0.1 | — | — |
| ISO-880 + B | — | <0.1 | — | — | — | <0.1 | — | — |

Though ordinary carbon material usually contains about 400 ppm of impurities, this impurity value can be decreased to not more than 10 ppm by halogenation treatment at high temperature (as disclosed in the Japanese Laid-Open Patent Publication (unexamined) No. 63-79759), and it is further possible to reduce total quantity of ash to 1 to 2 ppm when required. It may be said that the ISO-880 in this example is a material obtained by eliminating impurities beforehand using the halogenation treatment disclosed in the Japanese Patent Publication No. 63-79759, for example. Atomic absorption analysis and bright line spectrum analysis or the like were adopted together as analysis method. In the table, (-) indicates elements not detected.

As is explicit from the result of analysis of impurity amount before and after the treatment of boronization, increase of elements other than boron is not found.

Example 5

A test sample was prepared employing IG-110 as a matrix, the IG-110 being obtained by highly purifying IG-11 serving as carbon material in the same manner as Example 4 (content of boron of this sample was 4.2%).

Other test samples were prepared by the methods shown in Examples 1 and 3, and these samples were all subject to neutron irradiation test to acknowledge the manner of diffusion of boron element.

For such acknowledgment of diffusion of boron, the inventors took advantage of the property of boron having very high neutron absorption performance.

Described hereinafter are results of the mentioned recognition of dispersion or diffusion of boron in the test samples with the use of neutron irradiation method.

The neutron irradiation test was performed on the test samples prepared in Examples 1 and 3 as well as on the sample prepared according to the prior art.

Test samples employed:

(Test samples prepared according to prior art):

$B_4C$ powder available on the market was ground and those of 3 to 7 $\mu$m in grain size were selected to be employed as test sample. On the other hand, 50 parts by weight of coke powder (not larger than 15 $\mu$m in average grain size), 10 parts by weight of artificial graphite powder (not larger than 40 $\mu$m in average grain size) and 40 parts by weight of pitch were admixed together and kneaded while heating (at 230° C. for 2 hours), then molded and fine ground. Thereafter 7.7 parts by weight of the mentioned $B_4C$ particles were added to 100 parts by weight of the product obtained by the mentioned fine grinding, then heated and kneaded together with a small amount of caking agent. The kneaded product was further molded under pressure, and baked at 2000° C., thereby a test sample being obtained. As a result of chemical analysis, content of boron was 4.2% by weight (Value converted to pure boron element).

Each of the three test samples obtained as described above were then cut to be a thin plate of 2 mm in thickness, and subject to neutron irradiation test on the following manner:

Neutron irradiation testing device:

Neutron Radiography produced by Sumiju Test & Inspection.

Beam irradiation quantity:

34.4 $\mu$A 4653 sec (160.0 m Cb)

Neutron irradiation method:

Each test sample was put on a dry plate and irradiated with neutrons. Portions where neutron was absorbed became white, while portions where neutron was not absorbed were blackened by exposure.

Figure 2:
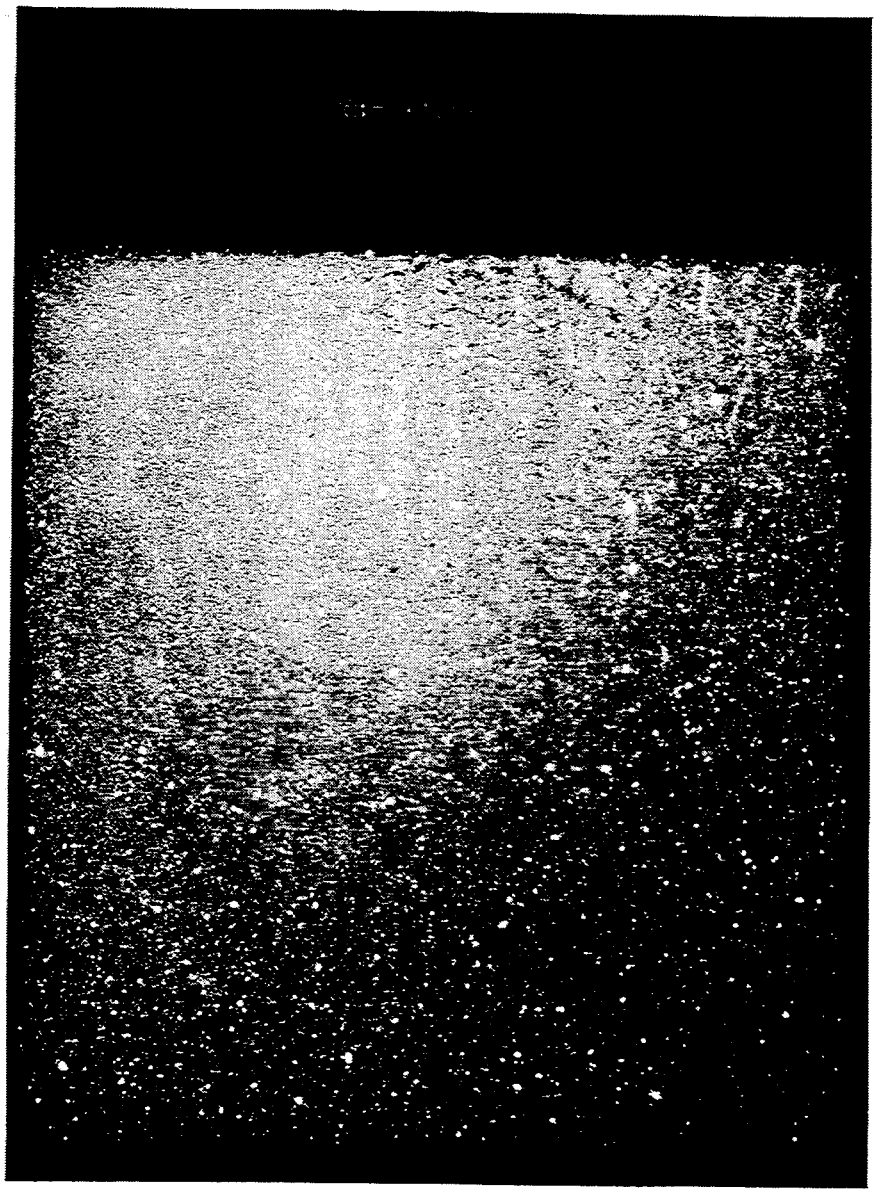

Test result:

FIGS. 1 to 2 show test results. These drawings are schematic explanatory views illustrated based on photos taken by exposure to neutron irradiation.

As for the product according to the prior art, boron compound was found existing in the form of $B_4C$ fine particles, and portions where neutron was absorbed remained in the form of white spots as unexposed parts. On the other hand, portions without boron (i.e., irradiated by neutron) remained blackened by exposure. The drawings show the mentioned spots of 10 magnifications to clearly show them.

In the case of Example 1, it is recognized that boron component are very finely and evenly diffused. No white spot is found no matter how enlarging the original photo picture. Accordingly, the exposure resulted in showing an even intermediate color between white and black on all over the picture in the drawings, and no white spot was found being different from FIG. 1.

As mentioned above referring to FIG. 1, despite that 4% boron compound existed actually, no portion of white dots showing absorption of boron was presented. This means that boron was diffused in the form of very fine particles.

In the case of Example 3, boron was impregnated into a carbon-carbon composite material. Though no result of analysis in the form of photogragh was prepared, it is understood that boron is ultrafinely distributed evenly throughout the entire test sample.

As is understood from the above-discussed comparison between the product obtained according to the prior art and that obtained according to the invention, there is a remarkable difference in the aspect of boron disperse or diffusion therebetween. Thus, in the present invention, it is obvious that boron is evenly diffused in such a manner as to be fine incomparable to $B_4C$ particles according to the prior art.

Substantially the same results as above were obtained also with regard to Examples 2 and 4.

In addition, the C-B composite material wherein boron component is ultra finely diffused has a superior oxidation resistance. Such oxidation resistance is an essential requirement in the event of using a carbon composite under oxidizing atmosphere. In this respect, described hereunder is an example of measurement of oxidation resistance of the test sample prepared by the method according to the invention:

Example 6

Oxidation resistance of the following (boron-carbon) composite material prepared by the methods in Examples 1 and 5 was analyzed.

Comparative Example 1

The test sample (containing 4.2% of boron) prepared by the method according to prior art (employing $B_4C$ powder: the same one as the mentioned neutron test).

Comparative Example 2

The carbon matrix (IG-11) employed at the time of preparing the test sample used in Example 1 (containing 0.0% of boron).

Comparative Example 3

The carbon matrix (IG-11) employed at the time of preparing the test sample used in Example 1 and further highly purified by halogenation method (IG-110) (containing 0.0% of boron).

Figure 3:
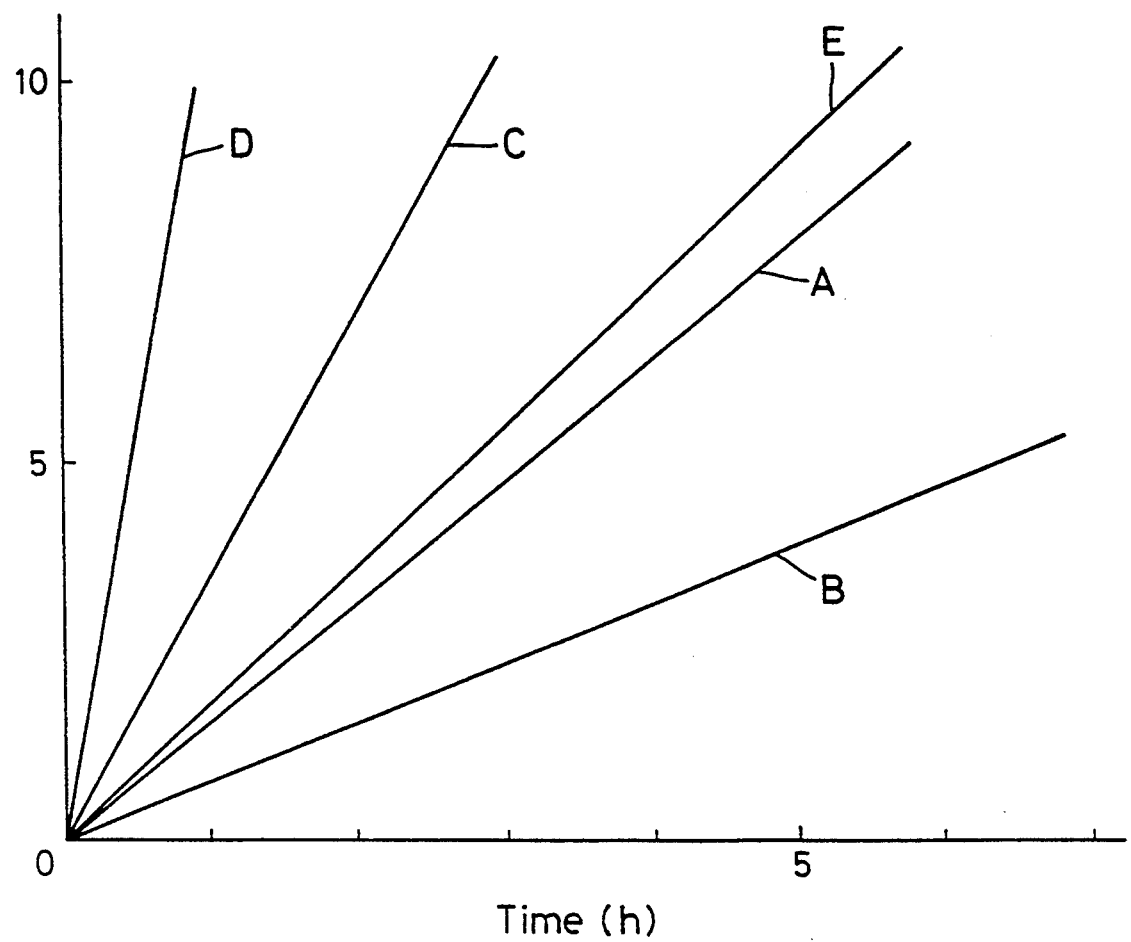
FIG. 3 is a graph showing percentage of oxidation exhaustion of various carbon materials.

Each of the above described five test samples was cut to (32×20×12.5 mm), then put and left in an air bath heater kept at 700° C. Reduction in weight and percentage of oxidation loss of each test sample was measured at appropriate time intervals. FIG. 3 shows the results of such measurement: where reference symbols respectively denote followings:
A: Example 1
B: Example 5
C: Comparative Example 1 (material according to prior art)
D: Comparative Example 2
E: Comparative Example 3

As is clearly seen from FIG. 3, in the Example 1 (hereinafter indicated as A in the drawing), oxidation resistance was remarkably improved by impregnation of boron component as compared with Comparative Example 2 (indicated as D) in which matrix (IG-11) before impregnation with boron component was employed. Moreover, it is to be noted that oxidation resistance was remarkably high when boron contents were at the same level, as compared with the product according to the prior method (Comparative Examples 1, C) in which B$_4$C powder was added. Substantially the same result was recognized through the comparison between Example 5 (B) in which treatment of boron addition was applied to a highly purified material and Comparative Example 3.

These results seem to come out by the following reason. That is, in the prior method, boron component which is a B$_4$C powder expected to perform oxidation resistance effect exists partially in the form of grains, and there are more portions without boron component from where oxidation begins. On the other hand, in the present invention, since boron component is very finely distributed throughout the entire part evenly, oxidation tends to be restrained as a whole.

For producing a C-B composite material of the present invention, it is to be noted that boronizing reaction of carbon material according to the method of the invention is featured by accomplishing even and ultra-fine diffusion of boron. A further feature exists in that the boronization is applicable to any kind and shape of carbon material without negatively affecting nature and physical property of object material.

In this sense, the foregoing Table 1 shows comparison between physical property before boronization of carbon material employed in the invention and that after boronization thereof. In addition, following Table 2 shows Comparative Example 4.

Comparative Example 4

The test sample prepared by the method according to Example 4 and not boronized at all.

TABLE 2

|  | Comp. Ex. 4 ISO-88 | Example 4 ISO-88 + B | Comp. Ex. 2 IG-11 | Example 1 IG-11 + B |
|---|---|---|---|---|
| Bulk specific gravity (g/cm$^3$) | 1.90 | 1.95 | 1.77 | 1.86 |
| Bending Strength (kg/cm$^2$) | 950 | 950 | 400 | 400 |
| Elastic Coefficient (kg/mm$^2$) | 1300 | 1300 | 1000 | 1000 |
| Thermal conductivity (W/mK) | 70 | 70 | 116 | 116 |

It is understood from the above Table 2 that, as a result of applying boronization, organization, structure, etc. of the original carbon material nor physical property thereof remains unchanged.

Example 7

Simulation test on a crucible for glass molding was carried out.

Figure 4:
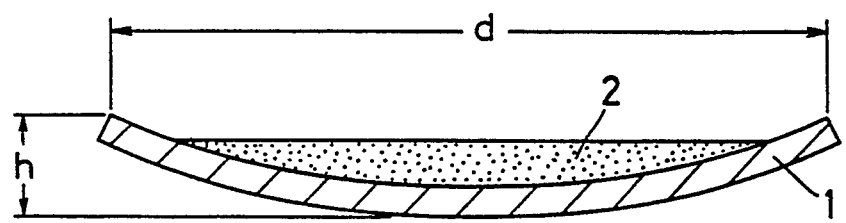
FIG. 4 is a schematic view for explaining a manner of simulation test on a crucible for use in glass molding.

Flat molds (1) shown in FIG. 4 were prepared respectively using "IG-11" (Comparative Example 2), Example 1 and the mentioned product according to prior art. Each molten boro-silicate glass (2) is injected into the mold (1) at 1300° C. under natural atmosphere, then solidified by natural cooling, and the solidified glass was taken out. This process was repeated to determine durability.

In the test, thickness of the mold was made thin for the purpose of obtaining test result in short time, and durability was determined by counting number of repetitions up to destruction of the mold due to repetitions. To be more specific, in the flat mold in FIG. 4, "d" is 50 $\phi$mm, "h" is 30 mm, and thickness is 3 mm.

| Material | Number of times | Sample |
|---|---|---|
| Comp. Example 2 (IG-11) | 5 | Comp. Example |
| Material by prior method | 8 | Comp. Example |
| Example 1 (IG-11 + B) | 15 | The invention |

As is seen from the above table, the carbon material according to the method of the invention exhibited a satisfiable durability as compared with the original matrix as a matter of course and with the carbon materials prepared by the prior method.

In another test on the same glass to which hermetic seal was applied, the invention was more effective than the product according to the prior art.

Example 8

When using a carbon material as a heat element under the atmosphere containing large amount of oxygen, carbon dioxide gas, moisture and the like, there usually arises a problem of deterioration due to oxidation exhaustion. Hence, it is preferable that even heating and partial heating in the heating element are as small as possible. From this viewpoint, the boron-carbon composite material according to the invention in which boron is evenly and finely diffused in graphite matrix is particularly effective.

Figure 5:
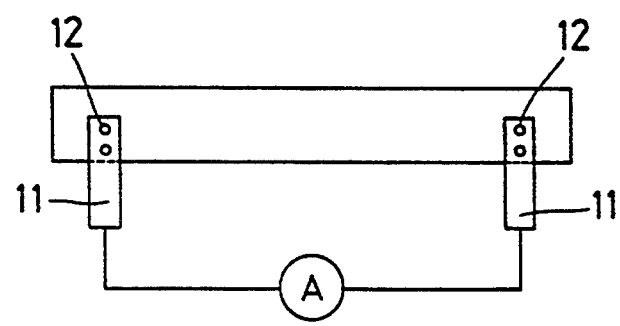
FIG. 5 is a schematic view for explaining a manner of durability test on a heating element.

Then, a heating element was prepared of the same material as Example 7, and subject to a deterioration test under the atmosphere using the method illustrated in FIG. 5 as follows:

| Material | Hour (h) | Sample |
|---|---|---|
| Comp. Example 2 (IG-11) | 0.5 | Comp. Example |
| Material by prior method | 1 | Comp. Example |
| Example 1 (IG-11 + B) | 2 | The invention |

Measurement conditions:
under atmosphere;
800° C.
measured was a time when electric current value was sharply reduced from normal current value due to imperfect contact at bolted part because of deterioration.

It is understood from the above result that the carbon material prepared by the method of the invention has a superior durability also when employed as a heating element.

Example 9

Forming a graphite containing boron into a cylinder for use in air hot press and employing an isotropic high density graphite as a punch, a hot press was manufactured, and a test was carried out on the life of cylinder.

In this test, $Al_2O_3$ powder was heat-treated at 1400° C. (for 2 hours) under 180 kg/cm$^2$. Cylinders were respectively prepared using the hot press of the same material as Example 7. Durability of each cylinder was tested by the method shown in FIG. 6.

| Material | Number of times |
|---|---|
| Comp. Example 2 (IG-11) | 5 |
| Boron material by prior method | 8 |
| Example 1 (IG-11 + B) (the invention) | 15 |

Figure 6:
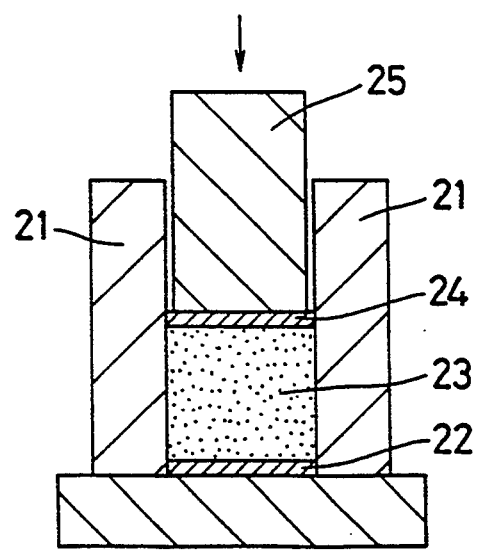
FIG. 6 is a schematic view for explaining a manner of durability test on a cylinder.

Referring to FIG. 6, lower part of the cylinder (21) was filled with alumina powder (23) interposing a separator (22), and another separator (24) was placed on the alumina powder. Then a pressure was applied by a punch (25) in the direction of the arrow, and number of times of repeated use showing a durability was measured.

What is claimed is:

1. A method for producing a composite material consisting essentially of carbon and boron which comprises:

impregnating, at a temperature of 600°–1,400° C. and a pressure of at least 50 kg/cm$^2$, a carbon material with a boron-containing compound selected from the group consisting of boron oxide, boron hydrate and an organic compound including boron or boron halide, said carbon material being one of an isotropic carbon material and a carbon-carbon composite material; and baking the impregnated carbon material in an inert gas at a pressure of at least 100 kg/cm$^2$ and at a temperature of at least 1,500° C.

2. A method for producing a composite material as set forth in claim 1, wherein the carbon material is a high density isotropic graphite.

3. A method for producing a composite material as set forth in claim 2, wherein the isotropic graphite contains less than 20 ppm of mineral impurities.

4. A method for producing a composite material as set forth in claim 1, wherein the carbon material is a carbon-carbon composite material reinforced by carbon fibers.

5. A method for producing a composite material as set forth in claim 1, wherein the boron-containing compound is in a liquid form.

6. A method for producing a composite material as set forth in claim 1, wherein the composite contains 0.1% by weight or less of free boron oxide.

7. A method for producing a composite material as set forth in claim 1, wherein said hydrate compound of boron oxide is a melt of boric acid ($B(OH)_3$ or $H_3BO_3$) or a solution thereof.

8. A method for producing a composite material according to claim 1, wherein the step of impregnating a carbon material with a boron-containing compound further comprises soaking the carbon material in the boron-containing compound at a temperature of 600°–1400° C. and a pressure of 50–100 kg/cm$^2$.

9. A method for producing a composite material consisting essentially of carbon and boron which comprises:

impregnating, at a temperature of 600°–1,400° C. and a pressure of at least 50 kg/cm$^2$, a carbon material with a boron-containing compound selected from the group consisting of boron oxide, boron hydrate and an organic compound including boron or boron halide, said carbon material being one of an isotropic carbon material and a carbon-carbon composite material;

baking the impregnated carbon material in an inert gas at a pressure of at least 100 kg/cm$^2$ and at a temperature of not lower than 1500° C. to react the boron-containing compound and the carbon material; and then heating the baked material at a pressure of not higher than 10 Torr and at a temperature not lower than 1000° C. for a length of time sufficient to remove substantially all unreacted boron-containing compound.

10. A method for producing a composite material according to claim 9, wherein the step of impregnating a carbon material with a boron-containing compound further comprises soaking the carbon material in the boron-containing compound at a temperature of 800°–1200° C. and a pressure of 50–100 kg/cm$^2$.

* * * * *